(12) United States Patent
Li et al.

(10) Patent No.: US 8,971,061 B2
(45) Date of Patent: Mar. 3, 2015

(54) OFF TIME CONTROL METHOD FOR SWITCHING REGULATOR

(75) Inventors: En Li, Hangzhou (CN); Yang Shi, Hangzhou (CN); Huanyu Lu, Hangzhou (CN); Junming Zhang, Hangzhou (CN); Yuancheng Ren, Hangzhou (CN)

(73) Assignee: Monolithic Power Systems, Inc., San Jose, CA (US)

( * ) Notice: Subject to any disclaimer, the term of this patent is extended or adjusted under 35 U.S.C. 154(b) by 684 days.

(21) Appl. No.: 12/687,035

(22) Filed: Jan. 13, 2010

(65) Prior Publication Data

US 2010/0201335 A1 Aug. 12, 2010

(30) Foreign Application Priority Data

Jan. 13, 2009 (CN) .......................... 2009 1 0058121

(51) Int. Cl.
*H02M 3/335* (2006.01)

(52) U.S. Cl.
CPC ................................ *H02M 3/33507* (2013.01)
USPC ....................................... 363/21.12; 323/284

(58) Field of Classification Search
CPC . H02M 3/156; H02M 3/1588; H02M 3/1563; H02M 3/335; H02M 3/33507
USPC ............ 363/21.04, 21.09, 21.1–21.12, 21.17, 363/21.18, 97; 323/282, 284, 285, 286, 287
See application file for complete search history.

(56) References Cited

U.S. PATENT DOCUMENTS

| | | | | |
|---|---|---|---|---|
| 5,805,439 | A * | 9/1998 | Kruppa | 363/142 |
| 6,356,466 | B1 * | 3/2002 | Smidt et al. | 363/21.17 |
| 7,291,992 | B2 * | 11/2007 | Miyazaki | 315/307 |
| 2004/0120171 | A1 * | 6/2004 | Choi et al. | 363/97 |
| 2006/0055389 | A1 * | 3/2006 | Rice | 323/288 |
| 2006/0119340 | A1 * | 6/2006 | Tateishi | 323/284 |
| 2008/0030178 | A1 * | 2/2008 | Leonard et al. | 323/282 |
| 2008/0298095 | A1 * | 12/2008 | Chuang et al. | 363/21.12 |
| 2009/0027020 | A1 * | 1/2009 | Qiu et al. | 323/282 |
| 2009/0027024 | A1 * | 1/2009 | Dequina | 323/283 |
| 2009/0033299 | A1 * | 2/2009 | Ishino | 323/282 |
| 2009/0153124 | A1 * | 6/2009 | Ishii | 323/290 |
| 2009/0243580 | A1 * | 10/2009 | Chen | 323/288 |
| 2009/0295339 | A1 * | 12/2009 | Wong | 320/162 |

OTHER PUBLICATIONS

Merriam Webster Online Dictionary, http://www.merriam-webster.com/dictionary/variable.*

* cited by examiner

*Primary Examiner* — Nguyen Tran
*Assistant Examiner* — Gustavo Rosario Benitez
(74) *Attorney, Agent, or Firm* — Perkins Coie LLP

(57) ABSTRACT

The present invention provides an off time control method and switching regulator using it. The current flowing through a switch is compared with a current threshold, and the switch is turned off if the current flowing through the switch is larger than the current threshold. The off time of the switch is determined by the load. The current threshold is variable at light load to prevent generating the audible noise and improve the whole efficiency.

8 Claims, 6 Drawing Sheets

OFF TIME CONTROL METHOD FOR SWITCHING REGULATOR

CROSS REFERENCE TO RELATED APPLICATIONS

This application claims priority to and the benefit of Chinese Patent Application No. 200910058121.0 filed on Jan. 13, 2009, which is incorporated herein by reference in its entirety.

TECHNICAL FIELD

The present invention generally relates to switching regulators, and more particularly, relates to a switching regulator with off time control.

BACKGROUND

Power supplies in many electronic devices output a DC voltage. Generally, the DC voltage is derived from an AC power source. The AC voltage is rectified into an unregulated DC voltage by a rectifier bridge. The unregulated DC voltage is converted into the DC voltage as needed by a switching power supply.

A transformer or inductor is usually used as a tank element in the switching power supply. For example, in a flyback converter a transformer is used. A switch is electrically coupled to the primary winding of the transformer. The switch is turned on and off so as to alternately store energy in the transformer and transfer the stored energy to the secondary winding of the transformer. An output capacitor is electrically coupled to the secondary winding of the transformer and a rectified voltage is generated thereon. The rectified voltage provides the DC output voltage of the switching power supply. The DC output voltage increases and decreases inversely with the load. The heavier the load, i.e. the higher the output current, the lower the output voltage, and vice versa. Generally, the DC output voltage is fedback to compensate for the variation of the load.

Under CCM (continuous current mode—which means the current flowing through the tank element is continuous), the output power of the switching power supply is $$P_{out\_CCM} = \frac{1}{2}L(I_{peak}^2 - I_{valley}^2)f\eta,$$

while under DCM (discontinuous current mode—which means the current flowing through the tank element is discontinuous), the output power is $$P_{out\_DCM} = \frac{1}{2}LI_{peak}^2 f\eta,$$

wherein L is the inductance of the tank element, $I_{peak}$ is the peak value of the current flowing through the tank element, $I_{valley}$ is the valley value of the current flowing through the tank element, f is the switching frequency and $\eta$ is the efficiency of the switching power supply.

One prior art method for controlling the switching power supply is to maintain the switching frequency constant while regulating the peak current, such as the peak current control. Another method is to maintain the peak current constant while regulating the switching frequency, such as the off time control. In the first method, the efficiency of the switching power supply will be greatly decreased at light load because of the fixed switching frequency. In the second method, the switching frequency may be decreased to be too low (below 20 KHz) at light load and an audible noise is generated.

BRIEF DESCRIPTION OF THE DRAWINGS

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

An AC/DC converter is used as an example thereafter. However, the present invention can be applied to any DC/DC topologies, such as buck, boost, buck-boost, flyback, flyforward and so on.

Figure 1:
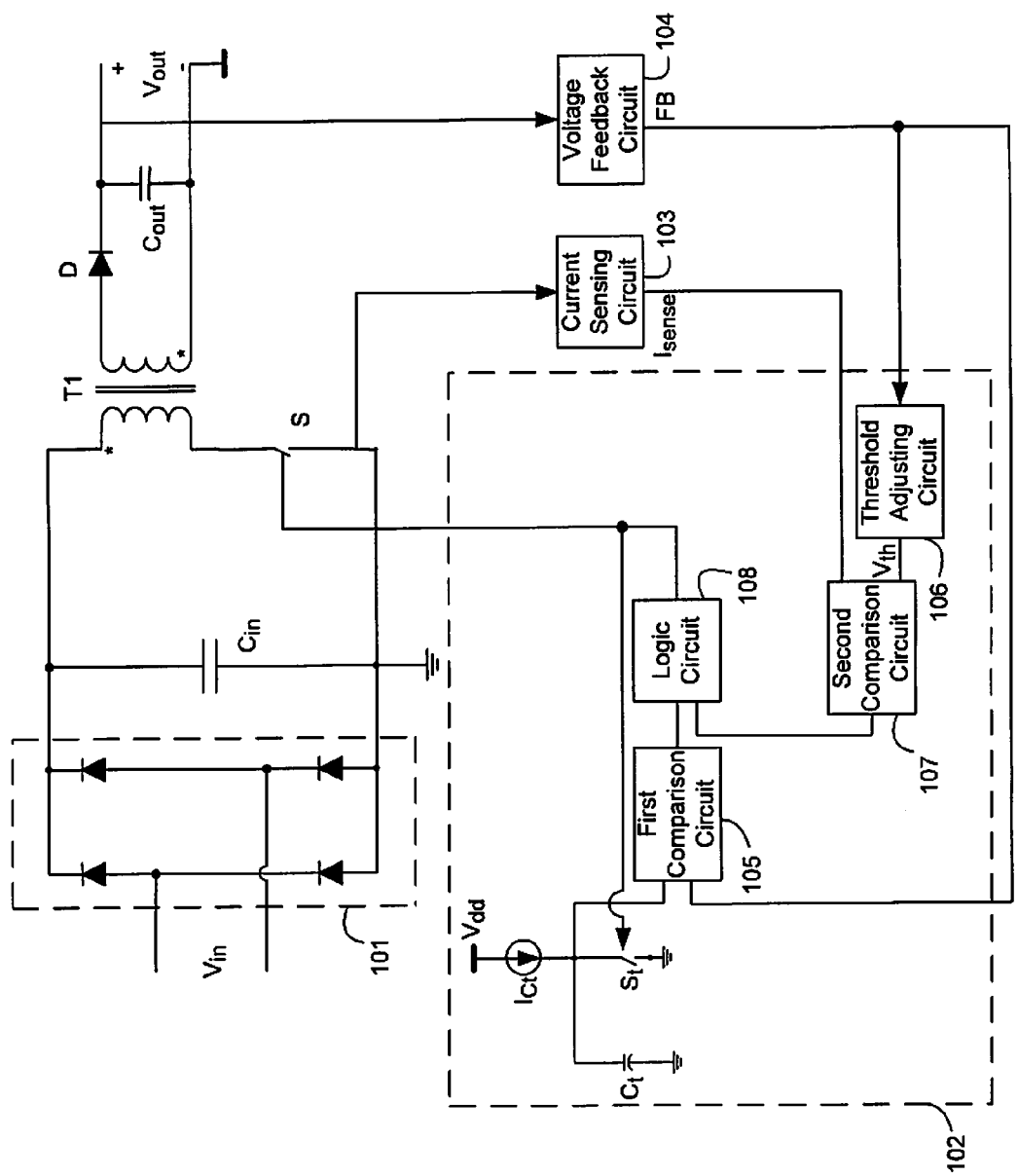
FIG. 1 is the block diagram of a switching regulator using off time control, in accordance with one embodiment of the present disclosure.

FIG. 1 is a block diagram of a switching regulator using off time control, in accordance with one embodiment of the present disclosure. It comprises a rectifier bridge 101, an input capacitor $C_{in}$, a transformer T1, a switch S, a diode D, an output capacitor $C_{out}$, a control circuit 102, a current sensing circuit 103 and a voltage feedback circuit 104, connected as shown. An off time control is used and the current flowing through the switch S is compared with a current threshold and the switch S is turned off when the current is larger than the current threshold. The off time of the switch S is determined by the load. The heavier the load, the shorter the off time, and vice versa. At light load, which means the output current of the switching regulator is smaller than an output current threshold to let the output voltage $V_{out}$ be larger than an output voltage threshold, the current threshold is variable with the load. The lighter the load, the smaller the current threshold. At non-light load, the current threshold is fixed.

In one embodiment, the diode D may be replaced by a synchronous switch. The current sensing circuit 103 is electrically coupled to the switch S to sense the current flowing through the switch S and generate a current sensing signal $I_{sense}$ representative of it. The current sensing circuit 103 may be realized by a resistor, transformer, current amplifier or the like. The voltage feedback circuit 104 is electrically coupled to the output terminals of the switching regulator to sense the output voltage $V_{out}$ and generate a feedback signal FB accordingly. The voltage feedback circuit 104 may comprise a photocoupler or transformer. In one embodiment, the transformer T1 further comprises an auxiliary winding. The voltage feedback voltage 104 is electrically coupled to the auxiliary winding to sense the voltage across it. The voltage across the auxiliary winding can represent the output voltage $V_{out}$. The voltage feedback circuit may comprise a resistive divider circuit or a capacitive divider circuit.

The control circuit 102 is electrically coupled to the switch S, the current sensing circuit 103 and the voltage feedback circuit 104, receives the current sensing signal $I_{sense}$ and the feedback signal FB, and controls the on and off of the switch S based on them. In one embodiment, the control circuit 102 comprises a capacitor $C_t$, a current source $I_{ct}$, a switch $S_t$, a first comparison circuit 105, a threshold adjusting circuit 106, a second comparison circuit 107 and a logic circuit 108. One terminal of the current source $I_{ct}$ receives a supply voltage $V_{dd}$. The capacitor $C_t$ and the switch $S_t$ are connected in parallel and electrically connected between the current source $I_{ct}$ and the ground. The current sensing signal $I_{sense}$ increases and decreases along with the current flowing through the switch S. The switches S and $S_t$ are turned off when the current sensing signal $I_{sense}$ is larger than the threshold $V_{th}$. The threshold adjusting circuit 106 is electrically coupled to the voltage feedback circuit 104, receives the feedback signal FB and generates a threshold $V_{th}$ accordingly. At light load, the threshold $V_{th}$ is variable, it is increased and decreased along with the load. At non-light load, the threshold $V_{th}$ is constant. The first comparison circuit 105 is electrically coupled to the capacitor $C_t$ and the voltage feedback circuit 104 compares the voltage across the capacitor $C_t$ with the feedback signal FB. The second comparison circuit 107 is electrically coupled to the current sensing circuit 103 and the threshold adjusting circuit 106, compares the current sensing signal $I_{sense}$ with the threshold $V_{th}$. The logic circuit 108 is electrically coupled to the first comparison circuit 105, the second comparison circuit 107, the switch S and the switch $S_t$, controls the on and off of these two switches based on the comparison results of the first comparison circuit 105 and the second comparison circuit 107. The on time of the switch S is determined by the primary inductance of the transformer T1, the input voltage $V_{in}$ and the threshold $V_{th}$, while the off time of switch S is determined by the load, the capacitor $C_t$ and the current source $I_{ct}$.

In one embodiment, the feedback signal FB increases and decreases inversely with the load. The switches S and $S_t$ are turned on when the voltage across the capacitor $C_t$ is larger than the feedback signal FB. When the load decreases, the feedback signal FB as well as the output voltage $V_{out}$ increases, the charging time of the capacitor $C_t$ increases accordingly, so the switching frequency of the switching regulator decreases.

In one embodiment, a bias voltage source is electrically connected between the voltage sensing circuit 104 and the first comparison circuit 105 to set the maximum switching frequency. The cathode of the bias voltage source is electrically connected to the voltage feedback circuit 104 while the anode is electrically connected to the first comparison circuit 105.

The switches S and $S_t$ may be any controllable semiconductor switching device. In one embodiment, the switches S and $S_t$ are MOSFETs (metal oxide semiconductor field effect transistor).

Figure 2:
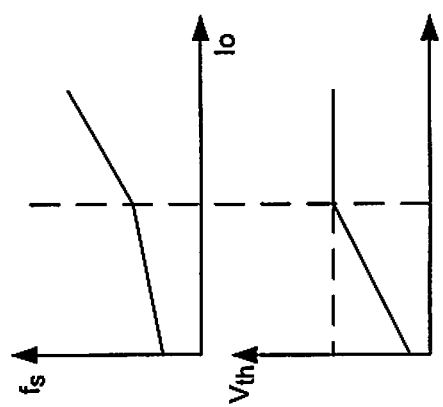
FIG. 2 is the waveform of the switching regulator using off time control shown in FIG. 1.

FIG. 2 is the waveform of the switching regulator using off time control shown in FIG. 1. When the load increases, the output voltage $V_{out}$ decreases, the off time of the switch S is decreased and the switching frequency is increased. Thus, more energy is transferred to the secondary winding of the transformer T1 when the switch S is off and the output voltage $V_{out}$ is restored. When the load decreases, the output voltage $V_{out}$ increases, the off time of the switch S is increased and the switching frequency is decreased. Thus, less energy is transferred to the secondary winding of the transformer T1 when the switch S is off and the output voltage $V_{out}$ is decreased. At light load, the threshold $V_{th}$ is variable with the load to avoid the audible noise generated by the transformer T1. Furthermore, the switching loss as well as the conduction loss of the switch S is reduced, so the efficiency of the switching regulator is improved.

Figure 3:
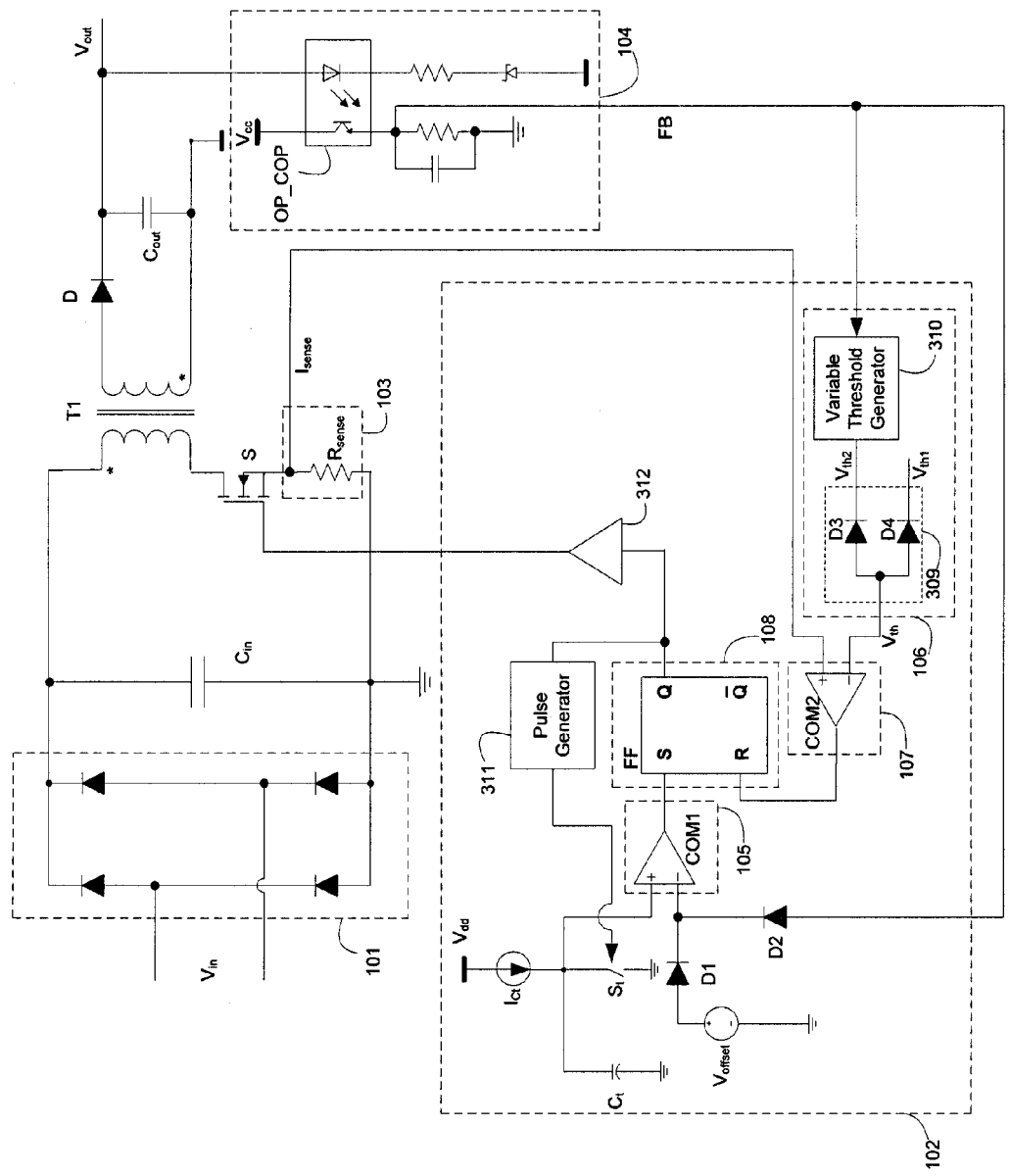
FIG. 3 illustrates a switching regulator using off time control, in accordance with one embodiment of the present disclosure.

FIG. 3 illustrates a switching regulator using off time control, in accordance with one embodiment of the present disclosure. The switch S is a NMOS (n-type MOSFET). The current sensing circuit 103 comprises a sensing resistor $R_{sense}$ electrically connected between the source of the switch S and the ground. The drain of the switch S is electrically connected to the primary winding of the transformer T1. The voltage feedback circuit 104 is electrically connected to the output terminals of the switching regulator, which comprises a photocoupler OP_COP and a three-terminal shunt regulator TR. The feedback signal FB increases and decreases along with the output voltage $V_{out}$. The first comparison circuit 105 comprises a comparator COM1. The non-inverting input terminal of the comparator COM1 is electrically coupled to the capacitor $C_t$ to receive the voltage across it, while the inverting input terminal is electrically connected to the cathodes of the diodes D1 and D2. The anode of the diode D1 is electrically connected to receive an offset voltage $V_{offset}$. The anode of the diode D2 is electrically connected to the voltage feedback circuit 104 to receive the feedback signal FB. The inverting input terminal of the comparator COM1 receives the bigger one of the feedback signal FB and the offset voltage $V_{offset}$.

The threshold adjusting circuit 106 comprises a threshold comparison circuit 309 and a variable threshold generator 310. The variable threshold generator 310 is electrically coupled to the voltage feedback circuit 104 to receive the feedback signal FB and generates a variable threshold $V_{th2}$ accordingly. The variable threshold $V_{th2}$ is increased and decreased inversely with the feedback signal FB. In one embodiment, the relationship between the variable threshold $V_{th2}$ and the feedback signal FB is $V_{th2}=V_{ref}-m*FB$, wherein $V_{ref}$ is a reference voltage and m is a constant. The threshold comparison circuit 309 is electrically coupled to the variable threshold generator 310 to receive the variable threshold $V_{th2}$, compares the variable threshold $V_{th2}$ with a constant threshold $V_{th1}$ and outputs the smaller one as the threshold $V_{th}$. In one embodiment, the threshold comparison circuit 309 comprises two diodes the anodes of which are electrically connected together to output the threshold $V_{th}$. The cathode of one diode is electrically connected to the variable threshold generator 310 to receive the variable threshold $V_{th2}$, while the cathode of the other diode receives the constant threshold $V_{th1}$.

The second comparison circuit 107 comprises a comparator COM2. The non-inverting input terminal of the comparator COM2 is electrically connected to the current sensing circuit 103 to receive the current sensing signal $I_{sense}$, while the inverting input terminal is electrically connected to the threshold adjusting circuit 106 to receive the threshold $V_{th}$. The logic circuit 108 comprises a RS flip-flop FF. The set terminal S of the RS flip-flop FF is electrically connected to the output terminal of the comparator COM1, while the reset terminal R is electrically connected to the output terminal of the comparator COM2. The output terminal of the RS flip-flop FF outputs a control signal to control the on and off of the switches S and $S_r$. A gate driver 312 is electrically connected between the output terminal of the RS flip-flop FF and the gate of the switch S, receives the control signal and generates a driving signal to drive the switch S on and off accordingly. The switch S is turned on when the control signal is high ("1") and turned off when the control signal is low ("0"). A pulse generator 311 is electrically connected between the output terminal of the RS flip-flop FF and the control terminal of the switch $S_r$, generates a pulse on the control signal's rising edge. The switch $S_r$ is turned on when the output of the pulse generator 311 is high ("1"), and turned off when the output of the pulse generator 311 is low ("0").

Figure 4:
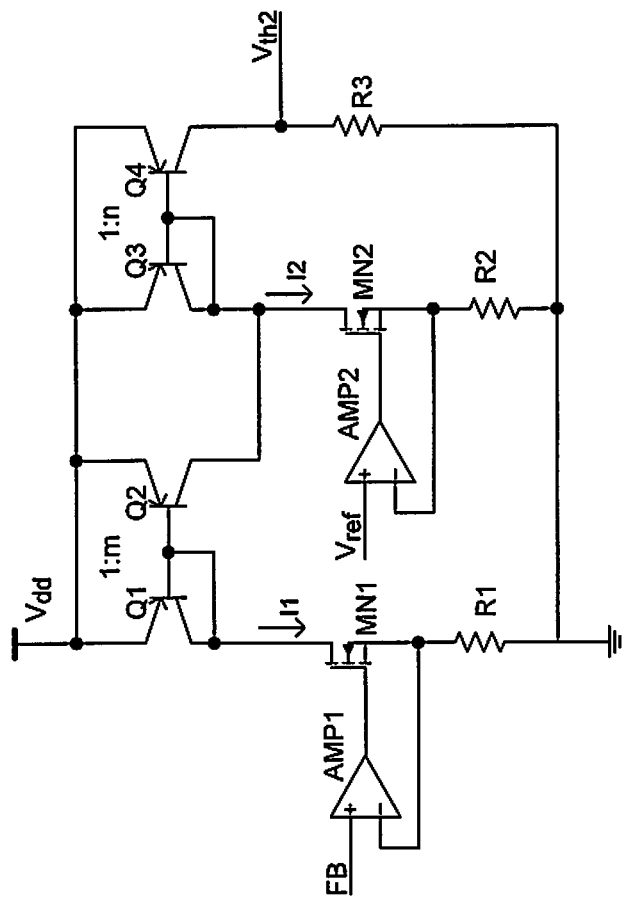
FIG. 4 illustrates the variable threshold generator shown in FIG. 3, in accordance with one embodiment of the present disclosure.

FIG. 4 illustrates the variable threshold generator shown in FIG. 3, in accordance with one embodiment of the present disclosure. It comprises amplifiers AMP1, AMP2, switches MN1, MN2, PNP triodes Q1, Q2, Q3 and Q4, and resistors R1, R2 and R3, connected as shown in FIG. 4. The current flowing through the triode Q1 is $$I_1 = \frac{FB}{R1},$$

and the current flowing through the triode MN2 is $$I_2 = \frac{V_{ref}}{R2}.$$

The triodes Q2 and Q1 constitute a current mirror, so the current flowing through the triodes Q2 and Q1 are proportional wherein the proportional coefficient is m. The current flowing through the triode Q3 is the difference between the current flowing through the switch MN2 and the current flowing through the triode Q2. The triodes Q4 and Q3 constitute a current mirror, so the current flowing through the triodes Q4 and Q3 are proportional wherein the proportional coefficient is n. The variable threshold $V_{th2}$ is the voltage across the resistor R3, which is equal to the product of the current flowing through the triode Q4 and the resistance of the resistor R3, so $$V_{th2} = n * \left(\frac{V_{ref}}{R2} - m * \frac{FB}{R1}\right) * R3.$$

When n=1 and R1=R2=R3, $V_{th2}=V_{ref}-m*FB$.

Figure 5:
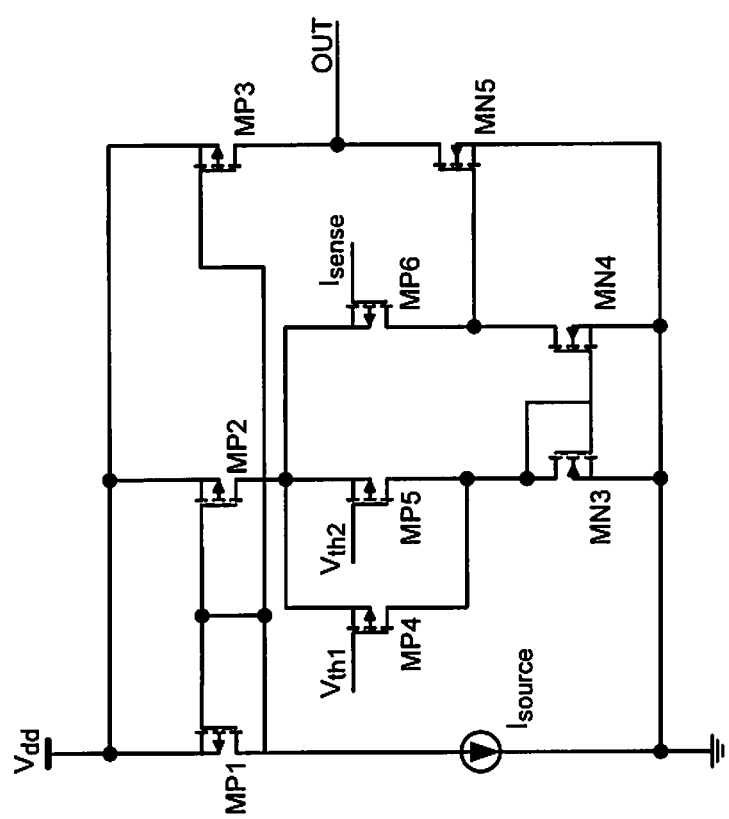
FIG. 5 illustrates the threshold comparison circuit shown in FIG. 3, in accordance with one embodiment of the present disclosure.

FIG. 5 illustrates the threshold comparison circuit shown in FIG. 3, in accordance with one embodiment of the present disclosure. The threshold comparison circuit 309 and the second comparison circuit 107 are integrated together to form a three terminal comparator. The structure of the three-terminal comparator is similar to the traditional comparator, but it has two inverting input terminals which receive the constant threshold $V_{th1}$ and the variable threshold $V_{th2}$ separately. The non-inverting input terminal of the three-terminal comparator receives the current sensing signal $I_{sense}$, and the output terminal outputs the comparison result OUT. As shown in FIG. 5, the constant threshold $V_{th1}$ and the variable threshold $V_{th2}$ are separately connected to the gates of the switches MP4 and MP5. Since the switches MP4 and MP5 are PMOS, if $V_{th1}>V_{th2}$, the current flowing through the switch MP4 can be neglected relative to the current flowing through the switch MP5, and the output signal OUT is the comparison result of the variable threshold $V_{th2}$ and the current sensing signal $I_{sense}$. Similarly, if $V_{th1}<V_{th2}$, the output signal OUT is the comparison result of the constant threshold $V_{th1}$ and the current sensing signal $I_{sense}$.

Figure 6:
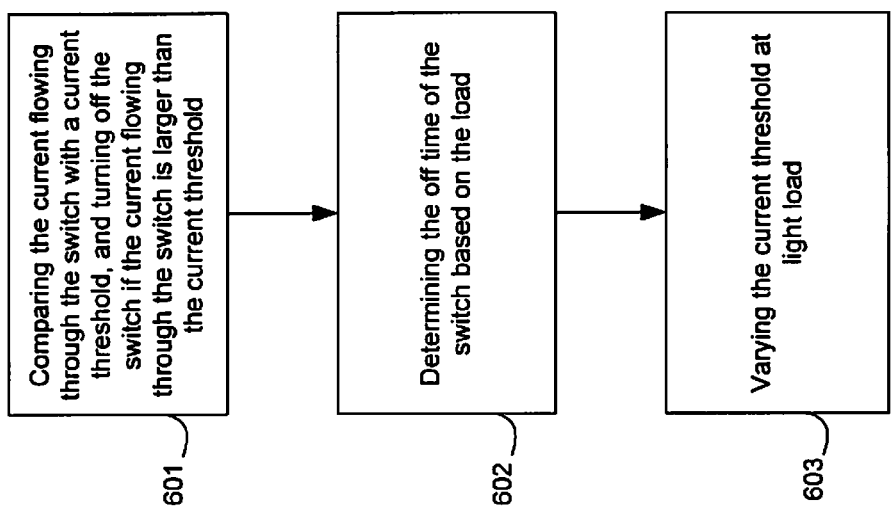
FIG. 6 is the flow chart of an off time control method, in accordance with one embodiment of the present disclosure.

FIG. 6 is the flow chart of an off time control method, in accordance with one embodiment of the present disclosure. The method is used to control a switching regulator which comprises a tank element and a switch, wherein the tank element stores energy when the switch is on and the stored energy is transferred to the load when the switch is off. The off time control method comprises steps 601-603.

Step 601, comparing the current flowing through the switch with a current threshold, and turning off the switch when the current flowing through the switch is larger than the current threshold.

Step 602, determining the off time of the switch based on the load. The off time of the switch is increased and decreased inversely with the load.

In step 603, varying the current threshold at light load. In one embodiment, at light load the current threshold is increased and decreased along with the load.

The method may further comprise: sensing the output voltage of the switching regulator and generating a feedback signal accordingly; sensing the current flowing through the switching and generating a current sensing signal representative of it; generating a threshold according to the feedback signal; comparing the current sensing signal with the threshold and turning off the switch according to the comparison result.

In one embodiment, the switching regulator further comprises a charging capacitor, a charging current source and a discharging switch. One terminal of the charging current source receives a supply voltage. The charging capacitor and the discharging switch are connected in parallel and electrically connected between the charging current source and the ground. The voltage across the charging capacitor is compared with the feedback signal to determine the turning off of the switch.

The current threshold may be maintained constant at non-light load. In one embodiment, the method further comprises generating a variable threshold according to the feedback signal wherein the variable threshold is increased and decreased along with the load, comparing the variable threshold with a constant and using the smaller one as the threshold which is compared with the current sensing signal.

In one embodiment, the feedback signal increases and decreases inversely with the load, and the variable threshold is a difference between a reference and the multiple of the feedback signal.

In one embodiment, the switching regulator comprises a flyback converter.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

We claim:

1. A switching regulator using off time control, comprising:
   a switch; and
   a control circuit, controlling the on and off of said switch; wherein said control circuit compares a current flowing through said switch with a current threshold and turns off said switch when the current flowing through said switch is larger than said current threshold, said control circuit further determines an off time of said switch based on the magnitude of a load; and said current threshold varies along with the load during light load and is maintained constant during heavy load, wherein during light load said current threshold is increased and decreased along with the load;
   a voltage feedback circuit, sensing an output voltage of said switching regulator and generating a feedback signal accordingly; and
   a current sensing circuit, electrically coupled to said switch, sensing the current flowing through said switch and generating a current sensing signal representative of it; wherein said control circuit comprises a threshold adjusting circuit which is electrically coupled to said voltage feedback circuit to receive said feedback signal and generate said current threshold accordingly; and said control circuit compares said current sensing signal with said current threshold and turns off said switch based on the comparison result
   wherein the threshold adjusting circuit comprises:
      a variable threshold generating circuit, electrically coupled to said voltage feedback circuit, receiving said feedback signal and generating a variable threshold accordingly, wherein said variable threshold is increased and decreased along with the load; and
      a threshold comparison circuit, electrically coupled to said variable threshold generating circuit, comparing said variable threshold with a constant threshold and outputting the smaller one of said variable threshold and said constant threshold as said current threshold.

2. The switching regulator of claim 1, wherein said feedback signal is increased and decreased reversely with the load, and said variable threshold is the difference between a reference and the multiple of said feedback signal.

3. The switching regulator of claim 1, wherein said control circuit further comprises:
   a charging current source, one terminal of said charging current source receives a supply voltage;
   a charging capacitor, electrically connected between said charging current source and ground; and
   a discharging switch, electrically connected to said charging capacitor in parallel;
   wherein said control circuit compares a voltage across said charging capacitor with said feedback signal and turns on said switch based on the comparison result.

4. The switching regulator of claim 3, wherein said control circuit further comprises:
   a first comparator, a non-inverting input terminal of said first comparator is electrically connected to said charging capacitor to receive the voltage across it, an inverting input terminal of said first comparator is electrically coupled to said voltage feedback circuit to receive said feedback signal;
   a second comparator, a non-inverting input terminal of said second comparator is electrically connected to said current sensing circuit to receive said current sensing signal, an inverting input terminal of said second comparator is electrically connected to said threshold adjusting circuit to receive said current threshold;
   a flip-flop, a set and reset terminals of said flip-flop are electrically connected to the output terminals of said first and second comparators separately, an output terminal of said flip-flop is electrically coupled to said switch and discharging switch to control the on and off of them.

5. The switching regulator of claim 4, wherein said control circuit further comprises two diodes with each diode having an anode and a cathode, and wherein the cathodes of the diodes are electrically connected together and connected to the inverting input terminal of said first comparator, the anode of one of the diodes is electrically connected to a voltage source, the anode of the other diode is electrically connected to said voltage feedback circuit to receive said feedback signal.

6. The switching regulator of claim 1, wherein said switch regulator comprises a flyback converter.

7. An off time control method, comprising: comparing a current flowing through a switch with a current threshold, and turning off said switch if the current flowing through said switch is larger than said current threshold; determining the an off time of said switch based on a load; and varying said current threshold along with the load during light load and maintaining said current threshold constant during heavy load, wherein during light load said current threshold is increased and decreased along with the load; and sensing the an output voltage of said a switching regulator and generating a feedback signal accordingly; sensing the current flowing through said switch and generating a current sensing signal representative of it; generating said current threshold according to said feedback signal; and comparing said current sensing signal with said current threshold and turning off said switch based on the comparison result; and generating a variable threshold according to said feedback signal, wherein said variable threshold is increased and decreased along with the load;
   comparing said variable threshold with a constant threshold and using the smaller one of said variable threshold and said constant threshold as said current threshold.

8. The method of claim 7, wherein said feedback signal is increased and decreased inversely with the load, and said variable threshold is the difference between a reference and the multiple of said feedback signal.

* * * * *